United States Patent [19]

Gerber

[11] 4,401,472

[45] Aug. 30, 1983

[54] HYDRAULIC CEMENT MIXES AND PROCESSES FOR IMPROVING HYDRAULIC CEMENT MIXES

[75] Inventor: Arthur H. Gerber, Beachwood, Ohio

[73] Assignee: Martin Marietta Corporation, Bethesda, Md.

[21] Appl. No.: 352,626

[22] Filed: Feb. 26, 1982

[51] Int. Cl.$^3$ ............................................. C04B 7/35
[52] U.S. Cl. ........................................ 106/90; 106/97; 106/104; 106/314
[58] Field of Search .................. 106/90, 97, 104, 314, 106/315

[56] References Cited

U.S. PATENT DOCUMENTS 3,674,522  7/1972  Brants et al. ........................ 106/314

Primary Examiner—James Poer
Attorney, Agent, or Firm—George W. Moxon, II; Bruce M. Winchell; Gay Chin

[57] ABSTRACT

A hydraulic cement mix including hydraulic cement, aggregate, sufficient water to effect hydraulic setting of the cement, and an additive comprising a poly(hydroxyalkylated)polyethyleneamine or a poly(hydroxyethyl)-polyethyleneimine or mixtures of each or both, the additive being present in an amount sufficient to increase the compressive strength of the hardened mix. Generally, the additive is present in a total amount of up to about 1.0% by weight based upon the weight of the cement, usually in an amount of between about 0.01% and about 0.25% by weight based upon the weight of the cement, preferably in an amount in the range of about 0.02% to about 0.07% by weight.

27 Claims, No Drawings

HYDRAULIC CEMENT MIXES AND PROCESSES FOR IMPROVING HYDRAULIC CEMENT MIXES

BACKGROUND OF THE INVENTION

This invention relates to additive compositions, otherwise known as admixtures, for incorporation in hydraulic cement mixes, for example, hydraulic cement concretes, mortars, and grouts, neat cement mixes, concrete blocks mixes, and dry mixes for making such concretes, mortars, and grouts, especially to increase the compressive strength of the hardened mix.

Admixtures are employed to achieve, among other things, water reduction, improved compressive strength, and retardation of the rate of hardening and setting of cement mixes. Frequently, greater compressive strengths are obtained when reduced quantities of water are utilized in hydraulic cement mixes, and so often water reduction and increased compressive strength are achieved together. Admixtures which increase compressive strength may also produce a retardation of the rate of set of the hydraulic cement mix. As retarders, such admixtures slow the chemical process of hydration so that the concrete remains plastic and workable for a longer time than concrete without such a retarder, which can result in increased hydration of the cement and ultimately increased compressive strengths. Although compressive strength improving admixtures can and usually do possess and produce additional features, they are valuable and desirable because of the increased compressive strength. Among the materials commonly used for improved compressive strength are the lignosulfonates, such as calcium lignosulfonate; salts of hydroxycarboxylic acids; sugars such as glucose (dextrose), maltose, sucrose, fructose, and the like; and highly polymerized polysaccharides, such as dextrins. These materials can produce additional results such as water reduction and/or retardation of the rate of set.

Other admixtures, known to increase the compressive strength of the hardened mix, also produce additional effects on the mix such as entraining air in the mix, or change the character of the mix, such as the stickiness or finishability of the mix. So, an admixture which could improve the compressive strength of the hardened mix without producing any other changes would be desirable.

Often, additives or admixtures are frequently used in combinations to achieve certain results or overcome inefficiencies or other features, such as where an admixture does produce a sufficient or significant improvement in the compressive strength, but also effects a significant degree of retardation. To overcome or compensate for these effects, whether desirable or not, such as for example, the excessive amount of retardation, well known accelerators, such as calcium chloride and triethanolamine, that increase the rate of hydration for early strength development are frequently used. In addition, an admixture which increased compressive strength without affecting other features would be useful where the beneficial features of other admixtures could be combined to emphasize the additional other features. Thus, admixtures which can be used in combination with other admixtures are also desirable.

Further, the problem of unavailability would apply to any new and improved admixture. Increasing demands can make admixtures unavailable. Lignosulfonates, for example, are not as ubiquitously available as they once were due to the pressure of, among others, environmental restrictions which have forced suppliers to find means of consuming these materials through their own corporate channels. Also, sugars and dextrins are subject to the whims and fancies of speculative interests, and so have become quite costly, as well as occasionally being unavailable.

Thus a need exists for additive compositions, or admixtures, for incorporation in hydraulic cement mixes, which additives will provide improved compressive strength for the resulting cement products.

SUMMARY OF THE INVENTION

The present invention is an additive composition or admixture for incorporation in hydraulic cement mixes, such as concretes, mortars, and grouts, neat cement mixes, nonplastic cement mixes, and dry mixes for making concretes, mortars, and grouts and thus the improved cement mixes and process for incorporating the additive composition.

For the purposes of this invention, the term "hydraulic cement" is intended to mean and to include all cementitious compositions capable of being set and hardened by the action of water, such as portland cements, sulphate-resisting cements, blast-furnace cements, pozzolanic cements, and high-alumina cements, since the additive composition or admixture of the present invention can be incorporated into all hydraulic cement mixes. But the preferred use of the present composition or admixture is in portland cement mixes. Also for the purposes of this invention, the term "portland cement" is intended to include all cementitious compositions which have a high content of tricalcium silicate and thus are portland cement or are chemically similar or analogous to and thus portland type cement, the specification for which is set forth in American Society for Testing Materials specification (ASTM) C-150-80. This would include cements, in which flyash, such as from steam or power generating stations, limestone, pozzolana slag, such as from blast furnaces, or mixtures of these, are incorporated and are considered portland cements, or portland blended cements such as those in ASTM C-595-79.

Broadly, the invention comprises a hydraulic cement mix including hydraulic cement, aggregate, sufficient water to effect hydraulic setting of the cement, and an additive comprising a poly(hydroxyalkylated)polyethyleneamine or mixtures thereof or a poly(hydroxyalkylated)polyethyleneimine or mixtures thereof or mixtures of both, said additive being present in an amount sufficient to increase the compressive strength of the hardened mix. The additive is preferably selected from N,N'-di-(hydroxyethyl)ethylenediamine, N,N,N'-tri-(hydroxyethyl)ethylenediamine, N,N,N'-tri-(hydroxyethyl)diethylenetriamine, N,N,N',N'-tetra(hydroxyethyl)ethylenediamine, N,N,N',N',N''-penta(hydroxyethyl)diethylenetriamine or poly(hydroxyethyl)polyethyleneimine.

The additive is present in a total amount of up to about 1.0% by weight based upon the weight of the cement, generally in an amount of between about 0.005% and about 0.5% by weight based upon the weight of the cement, preferably in an amount of the range of about 0.01% to about 0.10% by weight, with the range 0.02% to about 0.07% also being a preferred range. Use of the additive is beneficial to the engineering properties of hydraulic cement mixes in that it generally results in products having an increased compressive strength over similar mixes prepared without the additive, generally without affecting the rate of hardening of the mix. Further, use of this additive in portland cements within the preferred ranges generally results in an increase in the compressive strength of the hardened hydraulic cement mixes.

It is therefore an object of the present invention to provide improved hydraulic cement mixes.

It is another object of this invention to provide improved hydraulic cement mixes, such as portland cement mixes, including concrete, mortar and grout mixes, neat cement mixes, nonplastic cement mixes, and dry mixes, which include an additive composition or admixture which will advantageously increase the compressive strength of the hardened cement mix.

DETAILED DESCRIPTION OF THE INVENTION

In the practice of the present invention, a poly(hydroxyalkylated)polyethyleneamine or a poly(hydroxyalkylated)polyethyleneimine or mixtures of each or both are incorporated in hydraulic cement mixes, such as portland cement concretes and mortars, high alumina cement concretes and mortars, and dry mixes for making such concretes and mortars in amounts sufficient to increase the compressive strength of the hardened hydraulic cement mix.

For the purpose of this application, the term poly(hydroxyalkylated)polyethyleneamine is defined as having the following general formula:

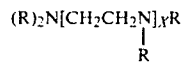

wherein X is 1, 2 or 3; and R is selected from hydrogen, 2-hydroxyethyl, 2-hydroxypropyl, and each R can be the same or different, but at least 40% of the R groups must be hydroxyalkyl, with no more than 40% of the R groups being hydroxypropyl. An example of a poly(hydroxyalkylated)polyamine is tetra(hydroxyethyl)ethylenediamine (also known as N,N,N',N'-tetrakis-(2-hydroxyethyl)ethylenediamine or $(HOCH_2CH_2)_2NCH_2CH_2N-(CH_2CH_2OH)_2)$, which is a commercially available product and has known utility as an organic intermediate, in the crosslinking of rigid urethane foams, as a chelating agent, a humectant, a gas absorbent and in detergent processing. Other examples are N,N'-di(hydroxyethyl)ethylenediamine; penta(hydroxyethyl)diethylenetriamine; and poly(hydroxyethyl)polyethyleneimine. An example of a poly(hydroxyalkyl)polyethyleneimine is poly(hydroxyethyl)polyethyleneimine, which is made by hydroxyalkylation of polyethyleneimine or by polymerization of N-hydroxyethyleneimine.

Broadly, the poly(hydroxyalkylated)polyethyleneamine or poly(hydroxyalkylated)polyethyleneimine will be incorporated in the cement mix in total amount of up to about 1.0% by weight based upon the weight of the cement, usually within the range of 0.01% to 0.1% by weight. A further preferred amount of the additive is 0.02% to 0.07% by weight, based upon the weight of the cement. The additive of the present invention is incorporated into hydraulic cement mixes preferably by adding it to a portion of the mix water used for mixing of the hydraulic cement and aggregate. But, the additive could be incorporated in any other convenient manner, including adding it to the dry mix before the water is incorporated therein.

The term aggregate is intended to include both fine aggregate, such as sand, and coarse aggregate, such as crushed stone or gravel, as is common in the art. In general for mortars, the aggregate may be sand or other fine aggregate meeting the requirements of ASTM standard C-33-80. The precise size, purity, quality, and quantity, or ranges thereof, of the fine and coarse aggregates will vary depending upon the desired use and properties of the mortar or concrete. For most common uses, although not limited thereto, the size of the fine aggregate will be within the broad range of about +4 mesh to −100 mesh U.S. Standard Sieve (ASTM C-11-70), while the size of the coarse aggregate will be within the board range of 3 inches (7.6 cm) to 4 mesh. The coarse aggregate will usually be of mineral origin, such as gravel or crushed rock, but it may in some cases consist at least partially of graded metallic material such as iron chips, or manufactured aggregate, such as slag.

Further in general for dry mortar mixes, the proportion of fine aggregate to cement will be in the range of about 25% to about 75% by weight based upon the weight of the cement mix, depending upon the nature of the aggregate and the desired properties and use of the mix.

For both the mortars and cements, the amount of water employed generally should be enough to effect hydraulic setting of the cement present in the mix and to provide suitable workability. This may broadly range from about 20% to 60% by weight of the cement in the mix for the mortars and about 25% to 70% by weight of the cement in the mix for the concretes. The precise amounts of water will depend upon the end use of the cement mix, as well as the aggregate and other admixtures present in the mix.

For purposes of illustrating the advantageous results obtainable by the practice of the present invention, plain cement mixes were prepared and compared with similar mixes in which various additives representative of the present invention were incorporated in varying dosages. The same time and brand of cement was used in each mix, and the proportion and kind of aggregate employed were substantially the same. A sufficient amount of water was added to each mix to effect hydraulic setting of the cement mix and to produce cement mixes of essentially the same consistency. The tests from which the results were derived were those commonly employed and standardized in the ASTM standards for testing cement and/or concrete mixes, including ASTM standards C-39-72 (1979), C-143-78, C-231-78, C-403-77, all of which are incorporated herein by reference. In addition and for the purpose of further illustrating the invention, comparisons were made with diethanolamine and triethanolamine which are known and commercially available as additives or admixtures and which are known to increase the strength of a hardened concrete mix.

The results shown in Tables I, II, III and IV illustrate generally the use of the admixture in accordance with the present invention in two Type I portland cement mixes (where the cements were from two different manufacturers) to form concretes. For convenience, the tests were run as a series of tests wherein the dosages were varied, and comparisons were made with a plain (no admixture) concrete mix. The fine aggregate to coarse aggregate ratio was between 0.46 and 0.47, the amount of cement was 420 lbs. per cubic yard (249 kg. per cubic meter) of concrete, and the consistencies of the concretes (measured as "slump" in accordance with ASTM C 143-78) were such that the mixes had slumps of 5 inches+½ inch (12.7 cm.±1.3 cm.). In each case the mix is a single mix, except in Table I, Series C, where the tests were duplicated for verification and so, for convenience, the results reported are the average of the two mixes.

TABLE I

| Mix No. | Additive | Dose; percent by weight of cement | Water lbs/cu.yd (kg/cu/mtr) | Air Vol. % | Rate of Hardening Relative to Plain (None) Mix[1] Hours Initial Set | Final Set | Compressive Strength; p.s.i. (MPa) 1 day | 7 day | 28 days |
|---|---|---|---|---|---|---|---|---|---|
| | | | SERIES A Cement No. 1 | | | | | | |
| 1 | NONE | 0 | 324 (192) | 1.8 | 0 (6¾) | 0 (8¾) | 619 (4.3) | 2288 (15.8) | 3619 (24.9) |
| 2 | A | .01 | 315 (187) | 1.9 | −¼ | −½ | 651 (4.5) | 2335 (16.1) | 4005 (27.6) |
| 3 | A | .025 | 311 (184) | 2.0 | −⅛ | −⅜ | 638 (4.4) | 2394 (16.5) | 4325 (29.8) |
| 4 | A | .05 | 311 (184) | 2.2 | 0 | −⅜ | 632 (4.3) | 2416 (16.6) | 4385 (30.2) |
| 5 | A | .1 | 311 (184) | 2.5 | +⅛ | −¼ | 625 (4.3) | 2460 (16.9) | 3972 (27.4) |
| 6 | DEA | .1 | 313 (186) | 1.9 | −½ | −¾ | 666 (4.6) | 2638 (18.2) | 4405 (30.4) |
| 7 | TEA | .025 | 315 (187) | 1.9 | −⅝ | −¾ | 742 (5.1) | 2744 (18.9) | 4470 (30.8) |
| | | | SERIES A Cement No. 2 | | | | | | |
| 8 | NONE | 0 | 327 (194) | 1.7 | 0 (6¾) | 0 (9¼) | 600 (4.1) | 2184 (15.0) | 3607 (24.9) |
| 9 | A | .01 | 318 (189) | 1.8 | 0 | +⅛ | 619 (4.3) | 2235 (15.4) | 3821 (26.3) |
| 10 | A | .025 | 316 (187) | 1.8 | +¼ | +⅛ | 625 (4.3) | 2281 (15.7) | 4246 (29.3) |
| 11 | A | .05 | 315 (187) | 2.0 | 0 | +⅜ | 623 (4.3) | 2363 (16.3) | 4435 (30.6) |
| 12 | A | .1 | 310 (184) | 2.9 | 0 | +¼ | 614 (4.2) | 2488 (17.1) | 4321 (29.8) |
| 13 | DEA | .1 | 312 (185) | 2.2 | −⅜ | −¾ | 672 (4.6) | 2475 (17.0) | 4435 (30.6) |
| 14 | TEA | .025 | 320 (190) | 1.9 | −⅜ | −¾ | 716 (4.9) | 2538 (17.5) | 3949 (27.2) |
| | | | SERIES B Cement No. 1 | | | | | | |
| 15 | NONE | 0 | 317 (188) | 2.0 | 0 (5¾) | 0 (8¾) | 617 (4.2) | 2399 (16.5) | 3555 (24.5) |
| 16 | A | .025 | 310 (184) | 2.5 | −¼ | −⅜ | 673 (4.6) | 2687 (18.5) | 4371 (30.1) |
| 17 | A + TEA | .025 + .015 | 311 (184) | 2.8 | −⅝ | −⅞ | 704 (4.8) | 2668 (18.4) | 4258 (29.5) |
| | | | SERIES B Cement No. 2 | | | | | | |
| 18 | NONE | 0 | 325 (193) | 1.7 | 0 (6⅛) | 0 (8⅝) | 573 (3.9) | 2026 (14.0) | 3494 (24.1) |
| 19 | A | .025 | 321 (190) | 2.0 | −⅛ | −⅜ | 632 (4.3) | 2394 (16.5) | 4126 (28.4) |
| 20 | A + TEA | .025 + .015 | 318 (189) | 2.2 | −½ | −1 | 657 (4.5) | 2405 (16.6) | 4118 (28.4) |
| | | | SERIES C Cement No. 1 | | | | | | |
| 21 | NONE | 0 | 318 (189) | 1.9 | 0 (6¾) | 0 (8¾) | 616 (4.2) | 2255 (15.5) | 3905 (26.9) |
| 22 | A | .025 | 308 (183) | 2.4 | −⅛ | −⅜ | 636 (4.4) | 2320 (16.0) | 4357 (30.0) |
| 23 | A | .05 | 307 (182) | 2.7 | −⅛ | −⅜ | 648 (4.5) | 2492 (17.2) | 4561 (31.4) |
| 24 | A | .075 | 305 (181) | 2.7 | −⅛ | −⅜ | 662 (4.6) | 2413 (16.6) | 4442 (30.6) |
| 25 | B | .025 | 304 (180) | 2.7 | −1/16 | −⅜ | 636 (4.4) | 2362 (16.2) | 4451 (30.7) |
| 26 | B | .05 | 303 (180) | 3.0 | −⅛ | −½ | 648 (4.4) | 2451 (16.9) | 4602 (31.7) |
| 27 | B | .075 | 303 (180) | 3.0 | 0 | −½ | 640 (4.4) | 2376 (16.4) | 4549 (31.4) |
| | | | SERIES C Cement No. 2 | | | | | | |
| 28 | NONE | 0 | 313 (186) | 2.0 | 0 (6¼) | 0 (8⅜) | 573 (3.9) | 2317 (16.0) | 3637 (25.1) |
| 29 | A | .025 | 297 (176) | 2.9 | −¼ | −¼ | 607 (4.2) | 2501 (17.2) | 4219 (29.1) |
| 30 | A | .05 | 297 | 3.1 | 0 | −¼ | 600 | 2553 | 4335 |

TABLE I-continued

| Mix No. | Additive | Dose; percent by weight of cement | Water lbs/cu.yd (kg/cu/mtr) | Air Vol. % | Rate of Hardening Relative to Plain (None) Mix[1] Hours Initial Set | Final Set | Compressive Strength; p.s.i. (MPa) 1 day | 7 day | 28 days |
|---|---|---|---|---|---|---|---|---|---|
| 31 | A | .075 | 295 (176) | 3.4 | −1/16 | −3/8 | 619 (4.3) | 2570 (17.7) | 4374 (30.1) |
| 32 | B | .025 | 301 (175) | 2.9 | −1/8 | −1/4 | 592 (4.1) | 2509 (17.3) | 4348 (30.0) |
| 33 | B | .05 | 296 (179) | 3.2 | −1/8 | −1/4 | 601 (4.1) | 2519 (17.4) | 4377 (30.2) |
| 34 | B | .075 | 298 (176) | 3.4 | +1/16 | −1/2 | 626 (4.4) | 2540 (17.5) | 4375 (30.2) |
| Series D Cement No. 1 | | | | | | | | | |
| 35 | NONE | 0 | 324 (192) | 1.6 | 0 (6⅞) | 0 (8⅜) | 663 (4.6) | 2254 (15.5) | 3660 (25.2) |
| 36 | B | .005 | 317 (188) | 2.0 | −1/4 | −1/2 | 686 (4.7) | 2341 (16.1) | 3921 (27.0) |
| 37 | B | .01 | 311 (184) | 2.0 | −1/4 | −1/2 | 713 (4.9) | 2444 (16.8) | 4128 (28.4) |
| 38 | B | .025 | 313 (186) | 2.1 | −1/4 | −3/8 | 694 (4.8) | 2365 (16.3) | 4169 (28.7) |
| 39 | B | .05 | 308 (183) | 2.6 | −1/4 | −1/2 | 686 (4.7) | 2443 (16.8) | 4444 (30.6) |
| 40 | B | .1 | 307 (182) | 2.9 | −3/8 | −3/4 | 676 (4.7) | 2522 (17.4) | 4310 (29.7) |
| 41 | B | .25 | 301 (179) | 4.0 | −1/4 | −3/8 | 610 (4.2) | 2701 (18.6) | 4443 (30.6) |
| 42 | DEA | .025 | 316 (187) | 1.9 | −1/4 | −3/8 | 635 (4.4) | 2328 (16.0) | 3823 (26.3) |
| 43 | DEA | .05 | 314 (186) | 2.1 | −3/8 | −5/8 | 624 (4.3) | 2413 (16.6) | 4048 (27.9) |
| 44 | DEA | .1 | 313 (186) | 2.3 | −1/2 | −5/8 | 604 (4.2) | 2576 (17.7) | 4287 (29.5) |
| SERIES D Cement No. 2 | | | | | | | | | |
| 45 | NONE | 0 | 323 (192) | 1.6 | 0 (6⅞) | 0 (9½) | 558 (3.8) | 2202 (15.2) | 3679 (25.4) |
| 46 | B | .005 | 312 (185) | 1.9 | −1/8 | −1/8 | 602 (4.1) | 2301 (15.9) | 3797 (26.2) |
| 47 | B | .01 | 312 (185) | 1.9 | −1/4 | −1/8 | 581 (4.0) | 2323 (16.0) | 3801 (26.2) |
| 48 | B | .025 | 308 (183) | 2.1 | 0 | −1/8 | 633 (4.4) | 2360 (16.3) | 4052 (27.9) |
| 49 | B | .05 | 311 (184) | 2.2 | −1/8 | −1/8 | 657 (4.5) | 2405 (16.6) | 4099 (28.2) |
| 50 | B | .1 | 303 (180) | 2.7 | −1/4 | −3/8 | 716 (4.9) | 2635 (18.2) | 4361 (30.1) |
| 51 | B | .25 | 302 (179) | 3.4 | −1/8 | −1/8 | 685 (4.7) | 2639 (18.2) | 4091 (28.2) |
| 52 | DEA | .025 | 312 (185) | 1.9 | −1/4 | −1/4 | 594 (4.1) | 2360 (16.3) | 3910 (26.9) |
| 53 | DEA | .05 | 312 (185) | 1.8 | −1/4 | −3/8 | 638 (4.4) | 2457 (16.9) | 3846 (26.5) |
| 54 | DEA | .1 | 312 (185) | 1.8 | 0 | −1/8 | 604 (4.2) | 2439 (16.8) | 3893 (26.8) |

[1] Acceleration of rate of hardening is indicated by a minus (−) sign, while retardation is indicated by a plus (+) sign.

TABLE II

| Mix No. | Additive | Dose; percent by weight of cement | Water lbs/cu.yd (kg/cu/mtr) | Air Vol. % | Rate of Hardening Relative to Plain (None) Mix[1] Hours Initial Set | Final Set | Compressive Strength; p.s.i. (MPa) 1 day | 7 day | 28 days |
|---|---|---|---|---|---|---|---|---|---|
| Cement No. 1 | | | | | | | | | |
| 55 | NONE | 0 | 315 (187) | 1.5 | 0 (5¾) | 0 (8⅜) | 628 (4.3) | 2188 (15.1) | 3688 (25.4) |
| 56 | C | .025 | 316 (187) | 1.8 | +1/4 | +1/4 | 664 (4.6) | 2269 (15.6) | 4063 (28.0) |
| 57 | C | .05 | 315 (187) | 2.1 | +1/4 | +3/8 | 644 (4.4) | 2250 (15.5) | 4369 (30.1) |
| 58 | B | .025 | 313 (186) | 2.0 | +1/2 | +1 | 663 (4.6) | 2250 (15.5) | 4088 (28.2) |

TABLE II-continued

| Mix No. | Additive | Dose; percent by weight of cement | Water lbs/cu.yd (kg/cu/mtr) | Air Vol. % | Rate of Hardening Relative to Plain (None) Mix[1] Hours Initial Set | Final Set | Compressive Strength; p.s.i. (MPa) 1 day | 7 day | 28 days |
|---|---|---|---|---|---|---|---|---|---|
| 59 | B | .05 | 310 (184) | 2.4 | +⅜ | +½ | 638 (4.4) | 2285 (15.7) | 4357 (30.0) |
| Cement No. 2 | | | | | | | | | |
| 60 | NONE | 0 | 325 (193) | 1.2 | 0 (6¾) | 0 (9) | 557 (3.8) | 2287 (15.8) | 3363 (23.2) |
| 61 | C | .025 | 323 (192) | 1.4 | +⅛ | +½ | 599 (4.1) | 2394 (16.5) | 3801 (26.2) |
| 62 | C | .05 | 320 (190) | 1.6 | 0 | +¼ | 602 (4.1) | 2368 (16.3) | 3898 (26.9) |
| 63 | B | .025 | 321 (190) | 1.4 | +¼ | +⅜ | 594 (4.1) | 2469 (17.0) | 3644 (25.1) |
| 64 | B | .05 | 313 (186) | 1.8 | +⅜ | +⅛ | 593 (4.1) | 2510 (17.3) | 3735 (25.7) |

[1]Acceleration of rate of hardening is indicated by a minus (−) sign, while retardation is indicated by a plus (+) sign.

TABLE III

| Mix No. | Additive | Dose; percent by weight of cement | Water lbs/cu.yd (kg/cu/mtr) | Air Vol. % | Rate of Hardening Relative to Plain (None) Mix[1] Hours Initial Set | Final Set | Compressive Strength; p.s.i. (MPa) 1 day | 7 day | 28 days |
|---|---|---|---|---|---|---|---|---|---|
| SERIES A Cement No. 1 | | | | | | | | | |
| 65 | NONE | 0 | 322 (191) | 1.8 | 0 (6¾) | 0 (8½) | 618 (4.3) | 2257 (15.5) | 3538 (24.4) |
| 66 | D | .01 | 314 (186) | 2.3 | −¼ | −¼ | 691 (4.8) | 2399 (16.5) | 4135 (28.5) |
| 67 | D | .025 | 316 (187) | 2.5 | +¼ | −⅛ | 643 (4.4) | 2350 (16.2) | 4243 (29.2) |
| 68 | D | .05 | 309 (183) | 3.1 | 0 | −⅛ | 656 (4.5) | 2461 (17.0) | 4543 (31.3) |
| 69 | D | .075 | 313 (186) | 2.8 | 0 | 0 | 665 (4.6) | 2507 (17.3) | 4554 (31.4) |
| 70 | A | .025 | 311 (184) | 2.9 | −⅛ | −¼ | 688 (4.7) | 2432 (16.8) | 4540 (31.3) |
| 71 | A | .05 | 311 (184) | 2.9 | 0 | −¼ | 669 (4.6) | 2407 (16.6) | 4463 (30.8) |
| 72 | TEA | .025 | 315 (187) | 2.6 | −1 | −1⅛ | 785 (5.4) | 2623 (18.1) | 4307 (29.7) |
| SERIES A Cement No. 2 | | | | | | | | | |
| 73 | NONE | 0 | 317 (188) | 2.1 | 0 (6) | 0 (8½) | 508 (3.5) | 2238 (15.4) | 3425 (23.6) |
| 74 | D | .01 | 312 (185) | 2.8 | 0 | 0 | 583 (4.0) | 2294 (15.8) | 3569 (24.6) |
| 75 | D | .025 | 310 (184) | 3.2 | 0 | +⅛ | 585 (4.0) | 2362 (16.3) | 3869 (26.7) |
| 76 | D | .05 | 306 (182) | 3.4 | 0 | +¼ | 576 (4.0) | 2565 (17.7) | 4038 (27.8) |
| 77 | D | .075 | 303 (180) | 3.6 | 0 | 0 | 628 (4.3) | 2655 (18.3) | 4120 (28.4) |
| 78 | A | .025 | 306 (182) | 3.1 | +⅛ | 0 | 616 (4.2) | 2411 (16.6) | 3961 (27.3) |
| 79 | A | .05 | 303 (180) | 3.6 | 0 | +⅜ | 644 (4.4) | 2515 (17.3) | 4068 (28.0) |
| 80 | TEA | .025 | 304 (180) | 3.3 | −¾ | −⅞ | 656 (4.5) | 2435 (16.8) | 3768 (26.0) |
| SERIES B Cement No. 1 | | | | | | | | | |
| 81 | NONE | 0 | 319 (189) | 1.7 | 0 (6) | 0 (8¼) | 629 (4.3) | 2200 (15.2) | 3598 (24.8) |
| 82 | E | .01 | 319 (189) | 1.5 | 0 | +¼ | 665 (4.6) | 2394 (16.5) | 3840 (26.5) |
| 83 | E | .025 | 312 (185) | 1.9 | 0 | 0 | 678 (4.7) | 2344 (16.1) | 4160 (28.7) |
| 84 | E | .05 | 316 (187) | 1.9 | +⅛ | +¼ | 668 (4.6) | 2313 (15.9) | 4144 (28.6) |
| 85 | F | .01 | 312 (185) | 1.8 | +⅛ | 0 | 706 (4.9) | 2446 (16.9) | 4090 (28.2) |
| 86 | F | .025 | 308 | 2.0 | +⅛ | −⅛ | 690 | 2471 | 4365 |

TABLE III-continued

| Mix No. | Additive | Dose; percent by weight of cement | Water lbs/cu.yd (kg/cu/mtr) | Air Vol. % | Rate of Hardening Relative to Plain (None) Mix[1] Hours | | Compressive Strength; p.s.i. (MPa) | | |
|---|---|---|---|---|---|---|---|---|---|
| | | | | | Initial Set | Final Set | 1 day | 7 day | 28 days |
| 87 | F | .05 | 314 (186) | 2.0 | 0 | +¼ | 669 (4.6) | 2397 (16.5) | 4093 (28.2) |
| 88 | A | .025 | 317 (188) | 1.9 | +¼ | +¼ | 676 (4.7) | 2375 (16.4) | 4223 (29.1) |
| 89 | A | .05 | 318 (189) | 2.0 | +¼ | 0 | 669 (4.6) | 2416 (16.6) | 4294 (29.6) |
| 90 | B | .025 | 314 (186) | 1.8 | +¾ | +¼ | 663 (4.6) | 2238 (15.4) | 4244 (29.2) |
| 91 | B | .05 | 316 (187) | 1.9 | 0 | −¼ | 638 (4.4) | 2280 (15.7) | 4175 (28.8) |
| | | SERIES B Cement No. 2 | | | | | | | |
| 92 | NONE | 0 | 320 (190) | 1.6 | 0 (6¼) | 0 (8¾) | 568 (3.9) | 2332 (16.1) | 3516 (24.2) |
| 93 | E | .01 | 318 (189) | 1.5 | −¼ | −⅝ | 587 (4.0) | 2379 (16.4) | 3628 (25.0) |
| 94 | E | .025 | 314 (186) | 1.7 | −¼ | −¾ | 648 (4.5) | 2566 (17.7) | 4112 (28.3) |
| 95 | E | .05 | 315 (187) | 1.7 | −¼ | −½ | 637 (4.4) | 2550 (17.6) | 4133 (28.5) |
| 96 | F | .01 | 311 (184) | 1.4 | −¼ | −½ | 623 (4.3) | 2544 (17.5) | 3941 (27.2) |
| 97 | F | .025 | 314 (186) | 1.6 | −¼ | −½ | 622 (4.3) | 2616 (18.0) | 4105 (28.3) |
| 98 | F | .05 | 310 (184) | 2.0 | +¼ | −¾ | 646 (4.4) | 2585 (17.8) | 4160 (28.7) |
| 99 | A | .025 | 312 (185) | 1.8 | −¼ | −⅞ | 669 (4.6) | 2613 (18.0) | 4167 (28.7) |
| 100 | A | .05 | 312 (185) | 1.8 | −¼ | −¾ | 688 (4.7) | 2616 (18.0) | 4243 (29.2) |
| 101 | B | .025 | 313 (186) | 1.6 | 0 | −½ | 643 (4.4) | 2507 (17.3) | 4194 (28.9) |
| 102 | B | .05 | 312 (185) | 1.9 | −¼ | −½ | 667 (4.6) | 2652 (18.3) | 4155 (28.6) |
| | | SERIES C Cement No. 1 | | | | | | | |
| 103 | NONE | 0 | 318 (189) | 1.6 | 0 (6¼) | 0 (8½) | 666 (4.6) | 2275 (15.7) | 3804 (26.2) |
| 104 | G | .01 | 317 (188) | 2.1 | 0 | 0 | 643 (4.4) | 2257 (15.5) | 4040 (27.8) |
| 105 | G | .025 | 311 (184) | 2.5 | −¼ | −¾ | 696 (4.8) | 2435 (16.8) | 4451 (30.7) |
| 106 | G | .05 | 308 (183) | 2.7 | −¼ | −¼ | 664 (4.6) | 2493 (17.2) | 4430 (30.5) |
| 107 | G | .10 | 312 (185) | 2.5 | −¾ | −¾ | 638 (4.4) | 2510 (17.3) | 4435 (30.6) |
| 108 | B | .05 | 312 (185) | 2.6 | +¼ | 0 | 629 (4.3) | 2262 (15.6) | 4179 (28.8) |
| 109 | C | .05 | 317 (188) | 2.2 | −¼ | −¼ | 685 (4.7) | 2327 (16.0) | 4050 (27.9) |
| | | SERIES C Cement No. 2 | | | | | | | |
| 110 | NONE | 0 | 322 (191) | 1.6 | 0 (6¼) | 0 (8¾) | 575 (4.0) | 2374 (16.4) | 3603 (24.8) |
| 111 | G | .01 | 319 (189) | 1.7 | −¼ | −¼ | 524 (3.6) | 2345 (16.2) | 3711 (25.6) |
| 112 | G | .025 | 312 (185) | 2.0 | −¼ | −¼ | 580 (4.0) | 2530 (17.4) | 4269 (29.4) |
| 113 | G | .05 | 311 (184) | 2.1 | −¼ | −½ | 627 (4.3) | 2562 (17.7) | 4365 (30.1) |
| 114 | G | .10 | 307 (182) | 2.3 | −¾ | −⅞ | 650 (4.5) | 2780 (19.2) | 4496 (31.0) |
| 115 | B | .05 | 303 (180) | 2.1 | −¾ | −¾ | 585 (4.0) | 2711 (18.7) | 4402 (30.3) |
| 116 | C | .05 | 307 (182) | 2.1 | −½ | −¾ | 577 (4.0) | 2744 (18.9) | 4480 (30.9) |
| | | SERIES D Cement No. 1 | | | | | | | |
| 117 | NONE | 0 | 325 (193) | 1.9 | 0 (6) | 0 (8½) | 636 (4.4) | 2144 (14.8) | 3690 (25.4) |
| 118 | H | .01 | 317 (188) | 3.5 | +¼ | −¼ | 625 (4.3) | 2057 (14.2) | 3768 (26.0) |
| 119 | H | .025 | 309 | 4.2 | +¼ | −¼ | 631 | 2137 | 3898 |

TABLE III-continued

| Mix No. | Additive | Dose; percent by weight of cement | Water lbs/cu.yd (kg/cu/mtr) | Air Vol. % | Rate of Hardening Relative to Plain (None) Mix[1] Hours Initial Set | Final Set | Compressive Strength; p.s.i. (MPa) 1 day | 7 day | 28 days |
|---|---|---|---|---|---|---|---|---|---|
| 120 | H | .05 | 305 (183) | 4.8 | 0 | 0 | 636 (4.3) | 2132 (14.7) | 3869 (26.9) |
| 121 | H | .10 | 303 (181) | 4.8 | +¼ | −¼ | 642 (4.4) | 2132 (14.7) | 4146 (26.7) |
| 122 | I | .01 | 317 (180) | 3.5 | +⅛ | −⅛ | 584 (4.0) | 1994 (13.7) | 3764 (28.6) |
| 123 | I | .025 | 306 (188) | 4.7 | +⅛ | 0 | 659 (4.5) | 2009 (13.8) | 3795 (25.9) |
| 124 | I | .05 | 303 (182) | 5.0 | +⅛ | −⅛ | 660 (4.5) | 2094 (14.4) | 4043 (26.2) |
| 125 | I | .10 | 303 (180) | 4.9 | 0 | 0 | 662 (4.6) | 2056 (14.2) | 4183 (27.9) |
| 126 | B | .05 | 317 (188) | 2.9 | +¼ | +⅛ | 593 (4.1) | 2169 (14.9) | 4040 (27.8) |
| SERIES D Cement No. 2 | | | | | | | | | |
| 127 | NONE | 0 | 328 (195) | 1.8 | 0 (7¼) | 0 (9⅞) | 388 (2.7) | 2065 (14.2) | 3198 (22.0) |
| 128 | H | .01 | 314 (186) | 3.2 | −⅛ | 0 | 394 (2.7) | 2144 (14.8) | 3226 (22.2) |
| 129 | H | .025 | 307 (182) | 3.9 | 0 | −⅛ | 413 (2.8) | 2174 (15.0) | 3494 (24.1) |
| 130 | H | .05 | 308 (183) | 4.2 | 0 | −⅛ | 406 (2.8) | 2260 (15.6) | 3410 (23.5) |
| 131 | H | .10 | 307 (182) | 4.3 | 0 | 0 | 419 (2.9) | 2268 (15.6) | 3649 (25.1) |
| 132 | I | .01 | 314 (186) | 3.3 | −½ | −⅜ | 403 (2.8) | 2191 (15.1) | 3338 (23.0) |
| 133 | I | .025 | 310 (184) | 4.2 | −¼ | −¼ | 419 (2.9) | 2168 (14.9) | 3463 (23.9) |
| 134 | I | .05 | 304 (180) | 4.3 | −¼ | −⅛ | 406 (2.8) | 2207 (15.2) | 3835 (26.4) |
| 135 | I | .10 | 305 (181) | 4.6 | −⅛ | −¼ | 419 (2.9) | 2220 (15.3) | 3883 (26.8) |
| 136 | B | .05 | 321 (190) | 2.3 | +⅛ | −¼ | 407 (2.8) | 2143 (14.8) | 3790 (26.1) |

[1]Acceleration of rate of hardening is indicated by a minus (−) sign, while retardation is indicated by a plus (+) sign.

TABLE IV

| Mix No. | Additive | Dose; percent by weight of cement | Water lbs/cu.yd (kg/cu/mtr) | Air Vol. % | Rate of Hardening Relative to Plain (None) Mix[1] Hours Initial Set | Final Set | Compressive Strength; p.s.i. (MPa) 1 day | 7 day | 28 days |
|---|---|---|---|---|---|---|---|---|---|
| Cement No. 1 | | | | | | | | | |
| 137 | NONE | 0 | 319 (189) | 2.1 | 0 (6¼) | 0 (8¼) | 616 (4.2) | 2175 (15.0) | 3619 (24.9) |
| 138 | J | .01 | 313 (186) | 2.5 | +⅛ | +¼ | 631 (4.3) | 2219 (15.3) | 3769 (26.0) |
| 139 | J | .025 | 310 (184) | 2.5 | −⅛ | +¼ | 646 (4.4) | 2318 (16.0) | 4113 (28.3) |
| 140 | J | .05 | 300 (178) | 3.2 | 0 | −⅛ | 669 (4.6) | 2552 (17.6) | 4316 (29.7) |
| 141 | J | .10 | 294 (174) | 5.2 | 0 | +¼ | 672 (4.6) | 2387 (16.4) | 4066 (28.0) |
| Cement No. 2 | | | | | | | | | |
| 142 | NONE | 0 | 327 (194) | 1.4 | 0 (6¼) | 0 (8¾) | 419 (2.9) | 1926 (13.3) | 3210 (22.1) |
| 143 | J | .01 | 321 (190) | 1.5 | −⅛ | +⅛ | 422 (2.9) | 1974 (13.6) | 3302 (22.8) |
| 144 | J | .025 | 318 (189) | 2.0 | +⅛ | +⅛ | 444 (3.1) | 1962 (13.5) | 3382 (23.3) |
| 145 | J | .05 | 306 (182) | 3.1 | +⅛ | 0 | 454 (3.1) | 2137 (14.7) | 3670 (25.3) |
| 146 | J | .10 | 301 | 4.2 | −⅛ | 0 | 463 | 2243 | 3739 |

TABLE IV-continued

| Mix No. | Additive | Dose; percent by weight of cement | Water lbs/cu.yd (kg/cu/mtr) | Air Vol. % | Rate of Hardening Relative to Plain (None) Mix[1] Hours | | Compressive Strength; p.s.i. (MPa) | | |
|---|---|---|---|---|---|---|---|---|---|
| | | | | | Initial Set | Final Set | 1 day | 7 day | 28 days |
| | | | (179) | | | | (3.2) | (15.5) | (25.8) |

[1]Acceleration of rate of hardening is indicated by a minus (−) sign, while retardation is indicated by a plus (+) sign.

In each series the rate of set is shown relative to the plain mix in that series. The actual rate of set of the plain mix is shown parenthetically.

In the Tables, DEA and TEA are commercially available alkanolamines, namely diethanolamine and triethanolamine, respectively, whereas additives A through J are identified as follows:

A—Tetra(hydroxyethyl)ethylenediamine
B—Tetra(hydroxyethyl)ethylenediamine
C—Tetra(hydroxyethyl)ethylenediamine
D—N,N,N'-tri-(hydroxyethyl)ethylenediamine
E—N,N,N'-tri-(hydroxyethyl)diethylenetriamine
F—Penta-(hydroxyethyl)diethylenetriamine
G—N,N'-di-(hydroxyethyl)ethylenediamine
H—N,N'-bis(2-hydroxypropyl)-diethylenetriamine
I—Bis-(2-hydroxypropyl)-tri-(hydroxyethyl)diethylenetriamine
J—Poly(hydroxyethyl)polyethyleneimine Additives A, B and C are the same, except that A and B are from different commercial sources, while C was produced in the laboratory, as will be described hereinafter. All the other poly(hydroxyalkylated)polyethyleneamines were purchased, except for additive H, which also was manufactured, as will be described hereinafter. While most of the additives were purchased, all of the poly(hydroxyalkylated)polyethyleneamines contemplated by this invention could be manufactured in the manner described herein. The poly(hydroxyalkylated)polyethyleneimine also was manufactured in the laboratory, as will be described hereinafter.

Tetra(hydroxyethyl)ethylenediamine was manufactured as follows:

A multi-necked 1-liter round bottom flask, was charged with 203.7 gm (3.39 moles) ethylene diamine and 160 gm water. The flask was fitted with a thermometer, overhead stirrer, dry ice condenser and a gas dispersing tube below the liquid surface. Ethylene oxide was introduced through the dispersing tube until 600 gm (13.6 moles) was added to the mixture and reacted with the ethylenediamine. The mixture was continuously stirred throughout the ethoxylation step. The temperature throughout this period was maintained at 20° C.–40° C. The resulting product was a water solution comprising 83% by weight tetra(hydroxyethyl)ethylenediamine with the appearance of a clear homogeneous syrup. An aliquot of the product solution was high vacuum dried and charcterized by infra-red and Nuclear Magnetic Resonance Spectra. Both the infrared spectra and the Nuclear Magnetic Resonance Spectra indicated that the manufactured material was essentially identical to the commercial material. The N,N'-[bis(2-hydroxypropyl)]-N,N',N''-[tri(hydroxyethyl)-]diethylenetriamine was manufactured using the same equipment mentioned above, with the addition of a 125 ml dropping funnel. The following was the precedent: The flask was charged with 352.8 gm (3.42 moles) of diethylenetriamine. Next, 417 gm (7.18 moles) of propylene oxide was added gradually through the dropping funnel while maintaining the reaction temperature at between about 30° C. and 45° C. This produces N,N'-bis(2-hydroxypropyl)diethylenetriamine, which itself is usable as an additive in accordance with the present invention and which was then subjected to the same ethoxylation step described above by introducing 75 gm of water and then 180 gm (4.09 moles) of ethylene oxide. The resulting product is the mixed poly(hydroxyalkylated)polyethyleneamine.

Poly(hydroxyalkylated)polyethyleneimines, such as poly(hydroxyethyl)polyethyleneimine, can be manufactured in the same equipment and ethoxylation method mentioned above. In that process, polyethyleneimine, which is commercially available in a variety of molecular weights, is subjected to ethoxylation. The precise molecular weight of the polyethyleneamine is not critical. In manufactured material used herein, the polyethyleneimine had a molecular weight of 600. Another source had a molecular weight of 1200.

As can be seen from Table I, the use of tetra(hydroxyethyl)ethylenediamine in accordance with the present invention produces an increased strength gain, especially at the later ages, e.g., 28 days. In mixes 5 and 12, a substantial amount of air was observed coming from the surface of the concrete mix—this could also be called unstable air—but as seen from the data in table I, the mixes did not result in excessive entrained air and did result in beneficial 28-day strength gains. Further, as seen from the data in Table I, Series D, later tests at the same and higher doses did not produce excessive or unstable air. So although it was not explained, it was not felt to be a problem. Still further, the combination of tetra(hydroxyethyl)ethylenediamine with TEA can produce both an acceleration of the rate of setting and hardening and an improved early (one day) compressive strength. Thus, tetra(hydroxyethyl)ethylenediamine would be useful in combination with other admixtures. The results in Table II demonstrate that the laboratory sunthesized or manufactured tetra(hydroxyethyl)ethylenediamine performs equivalently to the purchased product. The tests in Table III illustrate that other poly(hydroxyalkylated)polyamines are useful in increasing the compressive strength of hardened concrete mixes. The results in Table IV demonstrate that poly(hydroxyalkylated)polyethyleneimines are also useful in improving compressive strength in hardened concrete.

It is within the scope of the invention to incorporate, in the cement mixes prepared as herein provided, other additives known in the art for the express purpose for which they are normally employed. Such other additives may, for example, be air-entraining agents, air-detraining agents, pozzolanic materials, flyash, coloring agents, water repellants, other strength enhancing admixtures and the like. The admixtures of the present invention may also be employed in conjunction with a combination of such cement additives to produce desired changes in the physical properties of the concrete being produced.

It is also within the scope of the invention to employ the admixture of the present invention together with known set retarders, such as lignosulfonates, sugars, glucosaccharides, and the like, or combinations thereof to obtain improvement in the compressive strength of the hardened mix, but with less retarding effect than would result from such set retarders. The admixtures of the present invention can also be employed together with conventional set accelerators as mentioned above to achieve a desired combination of benefits.

While the invention has been described with reference to certain preferred embodiments thereof, those skilled in the art will appreciate that various changes and modifications and substitutions can be made without departing from the spirit of the invention. It is intended, therefore, that the invention will be limited only by the scope of the claims which follow.

We claim:

1. A hydraulic cement mix comprising a hydraulic cement, aggregate in an amount of up to 80% by weight based upon the total weight of said cement mix, sufficient water to effect hydraulic setting of the cement, and an additive comprising a poly(hydroxyalkylated)-polyethyleneamine or a poly(hydroxyalkylated)polyethyleneimine or mixtures of each or both, said additive being present in an amount sufficient to increase the compressive strength of the hardened mix.

2. A hydraulic cement mix in accordance with claim 1, wherein said hydraulic cement comprises portland cement.

3. A hydraulic cement mix in accordance with claim 1, wherein said additive is present in an amount of up to 1.0% by weight based upon the weight of the cement.

4. A hydraulic cement mix in accordance with claim 1, wherein said additive is present in an amount of between about 0.005% and about 0.25% by weight based upon the weight of the cement.

5. A hydraulic cement mix in accordance with claim 1, wherein said additive is present in an amount of between about 0.02% and about 0.07% by weight based upon the weight of the cement.

6. A hydraulic cement mix in accordance with claim 1, wherein said additive comprises tetra(hydroxyethyl)ethylenediamine.

7. A hydraulic cement mix in accordance with claim 1, wherein said additive comprises N,N'-di(hydroxyethyl)ethylenediamine.

8. A hydraulic cement mix in accordance with claim 1, wherein said additive comprises penta(hydroxyethyl)diethylenetriamine.

9. A hydraulic cement mix in accordance with claim 1, wherein the additive is poly(hydroxyalkylated)polyethyleneamine having the following formula:

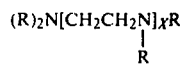

wherein X is 1, 2 or 3 and R is selected from hydrogen, 2-hydroxyethyl, and 2-hydroxypropyl, each R can be the same or different, and at least 40% of the R groups are hydroxyalkyl, with no more than 40% of the R groups being hydroxypropyl.

10. A hydraulic cement mix in accordance with claim 9, wherein X is 1 or 2.

11. A hydraulic cement mix in accordance with claim 1, wherein the additive is selected from the group consisting of tetra(hydroxyethyl)ethylenediamine, N,N,N'-tri-(hydroxyethyl)ethylenediamine, N,N,N'-tri-(hydroxyethyl)diethylenetriamine, penta-(hydroxyethyl)-diethylenetriamine, N,N'-di-(hydroxyethyl)ethylenediamine, N,N'-bis(2-hydroxypropyl)diethylenetriamine and bis-(2-hydroxypropyl)-tri(hydroxyethyl)-diethylenetriamine.

12. A hydraulic cement mix in accordance with claim 1, wherein the additive is poly(hydroxyethyl)polyethyleneimine.

13. A hydraulic cement mix in accordance with claim 1, wherein said aggregate is present in an amount of from 20% to 80% by weight.

14. A process for increasing the compressive strength of hardened hydraulic cement mixes which include hydraulic cement, aggregate in an amount of up to 80% by weight based upon the total weight of said cement mix, and sufficient water to effect hydraulic setting of the cement, comprising incorporating an additive comprising a poly(hydroxyalkylated)polyethyleneamine or a poly(hydroxyalkylated)polyethyleneimine or mixtures of each or both in an amount sufficient to increase the compressive strength of said cement mix.

15. A process in accordance with claim 14, wherein said hydraulic cement comprises portland cement.

16. A process in accordance with claim 14, wherein the said additive is present in an amount of up to 1.0% by weight based upon the weight of the cement.

17. A process in accordance with claim 14, wherein the said additive is present in an amount of between about 0.01% and 0.5% by weight based upon the weight of the cement.

18. A process in accordance with claim 14, wherein the said additive is present in an amount of between about 0.01% and 0.1% by weight based upon the weight of the cement.

19. A process in accordance with claim 14, wherein said additive is present in an amount of between 0.02% and 0.07% by weight based upon the weight of the cement.

20. A process in accordance with claim 14, wherein said additive comprises tetra(hydroxyethyl)ethylenediamine.

21. A process in accordance with claim 14, wherein said additive comprises N,N'-di(hydroxyethyl)ethylenediamine.

22. A process in accordance with claim 14, wherein said additive comprises penta(hydroxyethyl)diethylenetriamine.

23. A process in accordance with claim 14, wherein the additive is poly(hydroxyalkylated)polyethyleneamine having the following formula:

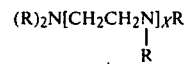

wherein X is 1, 2 or 3 and R is selected from hydrogen, 2-hydroxyethyl, and 2-hydroxypropyl, each R can be the same or different, and at least 40% of the R groups are hydroxyalkyl, with no more than 40% of the R groups being hydroxypropyl.

24. A process in accordance with claim 23, wherein X is 1 or 2.

25. A process in accordance with claim 14, wherein the additive is selected from the group consisting of tetra(hydroxyethyl)ethylenediamine, N,N,N'-tri-(hydroxyethyl)ethylenediamine, N,N,N'-tri-(hydroxyethyl)diethylenetriamine, penta-(hydroxyethyl)diethylenetriamine, N,N'-di(hydroxyethyl)ethylenediamine, N,N'-bis-(2-hydroxypropyl)diethylenetriamine, and bis-(2-hydroxypropyl)tri(hydroxyethyl)diethylenetriamine.

26. A process in accordance with claim 14, wherein the additive is poly(hydroxyethyl)polyethyleneimine.

27. A process in accordance with claim 14, wherein said aggregate is present in an amount of from 20% to 80% by weight.

* * * * *